(12) United States Patent
Graziosi et al.

(10) Patent No.: US 10,070,115 B2
(45) Date of Patent: Sep. 4, 2018

(54) METHODS FOR FULL PARALLAX COMPRESSED LIGHT FIELD SYNTHESIS UTILIZING DEPTH INFORMATION

(71) Applicant: Ostendo Technologies, Inc., Carlsbad, CA (US)

(72) Inventors: Danillo Bracco Graziosi, Carlsbad, CA (US); Zahir Y. Alpaslan, San Marcos, CA (US); Hussein S. El-Ghoroury, Carlsbad, CA (US)

(73) Assignee: Ostendo Technologies, Inc., Carlsbad, CA (US)

( * ) Notice: Subject to any disclaimer, the term of this patent is extended or adjusted under 35 U.S.C. 154(b) by 157 days.

(21) Appl. No.: 15/243,574

(22) Filed: Aug. 22, 2016

(65) Prior Publication Data

US 2016/0360177 A1 Dec. 8, 2016

Related U.S. Application Data

(63) Continuation of application No. PCT/US2016/028710, filed on Apr. 21, 2016.
(Continued)

(51) Int. Cl.
*H04N 13/00* (2018.01)
*G02B 6/00* (2006.01)
(Continued)

(52) U.S. Cl.
CPC .......... *H04N 13/0018* (2013.01); *G02B 6/00* (2013.01); *G06T 5/50* (2013.01); *G06T 15/00* (2013.01);
(Continued)

(58) Field of Classification Search
CPC ....... H04N 13/0018; G06T 5/50; G06T 15/00; G06T 2207/20221
(Continued)

(56) References Cited

U.S. PATENT DOCUMENTS 5,613,048 A 3/1997 Chen et al.
6,009,188 A 12/1999 Cohen et al.
(Continued)

FOREIGN PATENT DOCUMENTS

WO WO-2011/065738 6/2011
WO WO-2013/049699 4/2013

OTHER PUBLICATIONS

"International Search Report and Written Opinion of the International Searching Authority dated Jul. 29, 2016; International Application No. PCT/US2016/028710", Jul. 29, 2016.
(Continued)

*Primary Examiner* — Jeffery Williams
(74) *Attorney, Agent, or Firm* — Womble Bond Dickinson (US) LLP (57) ABSTRACT

An innovative method for synthesis of compressed light fields is described. Compressed light fields are commonly generated by sub-sampling light field views. The suppressed views must then be synthesized at the display, utilizing information from the compressed light field. The present invention describes a method for view synthesis that utilizes depth information of the scene to reconstruct the absent views. An innovative view merging method coupled with an efficient hole filling procedure compensates for depth misregistrations and inaccuracies to produce realistic synthesized views for full parallax light field displays.

15 Claims, 6 Drawing Sheets

Related U.S. Application Data (60) Provisional application No. 62/151,616, filed on Apr. 23, 2015.

(51) Int. Cl.
  *G06T 15/00* (2011.01)
  *G06T 5/50* (2006.01)
  *H04N 13/02* (2006.01)
  *H04N 13/04* (2006.01)

(52) U.S. Cl.
  CPC ....... *H04N 13/004* (2013.01); *H04N 13/0022* (2013.01); *H04N 13/0271* (2013.01); *H04N 13/0447* (2013.01); *G06T 2207/10052* (2013.01); *G06T 2207/20221* (2013.01)

(58) Field of Classification Search
  USPC .......................................................... 348/43
  See application file for complete search history.

(56) References Cited

U.S. PATENT DOCUMENTS

| | | | |
|---|---|---|---|
| 6,097,394 | A | 8/2000 | Levoy et al. |
| 6,738,533 | B1 | 5/2004 | Shum et al. |
| 6,963,431 | B2 | 11/2005 | Holzbach et al. |
| 7,404,645 | B2 | 7/2008 | Margulis |
| 7,623,560 | B2 | 11/2009 | El-Ghoroury et al. |
| 7,767,479 | B2 | 8/2010 | El-Ghoroury et al. |
| 7,829,902 | B2 | 11/2010 | El-Ghoroury et al. |
| 7,978,407 | B1 | 7/2011 | Connor |
| 8,049,231 | B2 | 11/2011 | El-Ghoroury et al. |
| 8,098,265 | B2 | 1/2012 | El-Ghoroury et al. |
| 8,155,456 | B2 | 4/2012 | Babacan et al. |
| 8,243,770 | B2 | 8/2012 | El-Ghoroury et al. |
| 8,284,237 | B2 | 10/2012 | Chen et al. |
| 8,401,316 | B2 | 3/2013 | Babacan et al. |
| 8,567,960 | B2 | 10/2013 | El-Ghoroury et al. |
| 8,681,185 | B2 | 3/2014 | Guncer |
| 8,854,724 | B2 | 10/2014 | El-Ghoroury et al. |
| 8,928,969 | B2 | 1/2015 | Alpaslan et al. |
| 8,970,646 | B2 | 3/2015 | Guncer |
| 9,129,183 | B2 | 9/2015 | Venkataraman et al. |
| 9,179,126 | B2 | 11/2015 | El-Ghoroury et al. |
| 9,195,053 | B2 | 11/2015 | El-Ghoroury et al. |
| 9,524,682 | B2 | 12/2016 | El-Ghoroury et al. |
| 9,681,069 | B2 | 6/2017 | El-Ghoroury et al. |
| 9,712,764 | B2 | 7/2017 | El-Ghoroury et al. |
| 9,769,365 | B1 | 9/2017 | Jannard |
| 2002/0067521 | A1 | 6/2002 | Holzbach et al. |
| 2008/0043095 | A1 | 2/2008 | Vetro et al. |
| 2008/0043096 | A1 | 2/2008 | Vetro et al. |
| 2009/0086170 | A1 | 4/2009 | El-Ghoroury et al. |
| 2009/0268970 | A1 | 10/2009 | Babacan et al. |
| 2009/0278998 | A1 | 11/2009 | El-Ghoroury et al. |
| 2010/0003777 | A1 | 1/2010 | El-Ghoroury et al. |
| 2010/0007804 | A1 | 1/2010 | Guncer |
| 2010/0046848 | A1 | 2/2010 | Witzgall |
| 2010/0066921 | A1 | 3/2010 | El-Ghoroury et al. |
| 2010/0091050 | A1 | 4/2010 | El-Ghoroury et al. |
| 2010/0156894 | A1 | 6/2010 | Holler et al. |
| 2010/0220042 | A1 | 9/2010 | El-Ghoroury et al. |
| 2010/0225679 | A1 | 9/2010 | Guncer |
| 2010/0231585 | A1 | 9/2010 | Weiblen |
| 2010/0265385 | A1 | 10/2010 | Knight et al. |
| 2010/0309287 | A1 | 12/2010 | Rodriguez |
| 2011/0058021 | A1 | 3/2011 | Chen et al. |
| 2011/0134227 | A1 | 6/2011 | Shin |
| 2011/0255592 | A1 | 10/2011 | Sung et al. |
| 2011/0261050 | A1* | 10/2011 | Smolic .................... G06T 15/20 345/419 |
| 2012/0033113 | A1 | 2/2012 | El-Ghoroury et al. |
| 2012/0050481 | A1 | 3/2012 | Chen et al. |
| 2012/0069154 | A1 | 3/2012 | Talstra et al. |
| 2012/0105310 | A1 | 5/2012 | Sverdrup et al. |
| 2012/0183232 | A1 | 7/2012 | Babacan et al. |
| 2012/0213270 | A1 | 8/2012 | Baraniuk et al. |
| 2012/0309455 | A1 | 12/2012 | Klose et al. |
| 2012/0327139 | A1 | 12/2012 | Margulis |
| 2013/0010057 | A1 | 1/2013 | Borel et al. |
| 2013/0077880 | A1 | 3/2013 | Venkataraman et al. |
| 2013/0077882 | A1 | 3/2013 | Venkataraman et al. |
| 2013/0141895 | A1 | 6/2013 | Alpaslan et al. |
| 2013/0222633 | A1 | 8/2013 | Knight et al. |
| 2013/0258451 | A1 | 10/2013 | El-Ghoroury et al. |
| 2013/0282639 | A1 | 10/2013 | Potkonjak |
| 2013/0286053 | A1 | 10/2013 | Fleck et al. |
| 2013/0286178 | A1 | 10/2013 | Lewis et al. |
| 2013/0321581 | A1 | 12/2013 | El-Ghoroury et al. |
| 2013/0342644 | A1 | 12/2013 | Rusanovskyy et al. |
| 2014/0002675 | A1 | 1/2014 | Duparre et al. |
| 2014/0079336 | A1 | 3/2014 | Venkataraman et al. |
| 2014/0092281 | A1 | 4/2014 | Nisenzon et al. |
| 2014/0098189 | A1 | 4/2014 | Deng et al. |
| 2014/0146201 | A1 | 5/2014 | Knight et al. |
| 2014/0168062 | A1 | 6/2014 | Katz et al. |
| 2014/0210823 | A1 | 7/2014 | Maguire, Jr. |
| 2014/0219558 | A1 | 8/2014 | Teng et al. |
| 2014/0232822 | A1 | 8/2014 | Venkataraman et al. |
| 2014/0285429 | A1 | 9/2014 | Simmons |
| 2014/0292620 | A1 | 10/2014 | Lapstun |
| 2014/0340434 | A1 | 11/2014 | El-Ghoroury et al. |
| 2014/0347361 | A1 | 11/2014 | Alpaslan et al. |
| 2014/0375856 | A1 | 12/2014 | Kaneko |
| 2015/0033539 | A1 | 2/2015 | El-Ghoroury et al. |
| 2015/0201176 | A1 | 7/2015 | Graziosi et al. |
| 2015/0264223 | A1 | 9/2015 | Akenine-Moller et al. |
| 2015/0312560 | A1 | 10/2015 | Deering et al. |
| 2016/0021355 | A1 | 1/2016 | Alpaslan et al. |
| 2016/0028935 | A1 | 1/2016 | El-Ghoroury et al. |
| 2016/0182782 | A1 | 6/2016 | El-Ghoroury et al. |
| 2016/0191765 | A1 | 6/2016 | El-Ghoroury et al. |
| 2016/0191823 | A1 | 6/2016 | El-Ghoroury et al. |
| 2016/0360177 | A1 | 12/2016 | Graziosi et al. |
| 2017/0184776 | A1 | 6/2017 | El-Ghoroury et al. |
| 2017/0264879 | A1 | 9/2017 | Zhou |

OTHER PUBLICATIONS

Aggoun, Amar et al., "Immersive 3D Holoscopic Video System", IEEE Multimedia Magazine, Special Issue on 3D Imaging Techniques and Multimedia Applications, vol. 20, No. 1, Jan.-Mar. 2013, pp. 28-37.

Akeley, Kurt et al., "A Stereo Display Prototype with Multiple Focal Distances", ACM Trans. Graph. (SIGGRAPH), vol. 23, 2004, pp. 804-813.

Alpaslan, Zahir Y. et al., "Development and Deployment of a Tiled Full Parallax Light Field Display System", Proceedings of the SPIE, Applications of Digital Image Processing XXXIX, vol. 9971, Sep. 27, 2016, pp. 99710J-1 to 99710J-8.

Alpaslan, Zahir Y. et al., "Parametric Characterization of Perceived Light Field Display Resolution", SID Symposium Digest of Technical Papers, vol. 47, No. 1, May 2016, pp. 1241-1245.

Alpaslan, Zahir Y. et al., "Small Form Factor Full Parallax Tiled Light Field Display", Proceedings of Electronic Imaging, SPIE-IS &T, vol. 9391, Feb. 9, 2015, pp. 93910E-1 to 93910E-10.

Arai, Jun et al., "Integral Three-Dimensional Television Using a 33-Megapixel Imaging System", Journal of Display Technology, vol. 6, No. 10, Oct. 2010, pp. 422-430.

Arai, Jun , "Three-Dimensional Television System Based on Spatial Imaging Method Using Integral Photography", International Conference on Acoustics, Speech, and Signal Processing (ICASSP) 2012, May 7-9, 2012, pp. 5449-5452.

Balogh, Tibor , "The HoloVizio System", Stereoscopic Displays and Virtual Reality Systems XIII, Proceedings of the SPIE-IS&T Electronic Imaging, vol. 6011, Jan. 27, 2006, pp. 60550U-1 to 60550U-12.

Bhaskaran, Vasudev , "65.1: Invited Paper: Image/Video Compression—A Display Centric Viewpoint", SID Symposium Digest of Technical Papers, vol. 38, No. 1, 2008, pp. 990-993.

(56) References Cited

OTHER PUBLICATIONS

Cakmakci, Ozan et al., "Head-Worn Displays: A Review", Journal of Display Technology, vol. 2, No. 3, Sep. 2006, pp. 199-216.
Candes, Emmanuel et al., "Near Optimal Signal Recovery From Random Projections: Universal Encoding Strategies?", 2004, pp. 1-39.
Candes, Emmanuel J. et al., "Robust Uncertainty Principles: Exact Signal Reconstruction From Highly Incomplete Frequency Information", IEEE Transactions on Information Theory, vol. 52, No. 2, Feb. 2006, pp. 489-509.
Chai, Jin-Xiang et al., "Plenoptic Sampling", Proceedings of the 27th Annual Conference on Computer Graphics and Interactive Techniques—SIGGRAPH '00, 2000, pp. 307-318.
Chen, Jianhong et al., "True Color Optical Simulation of Integral Imaging 3D Display", Proceedings of the International Display Workshops, vol. 21, Dec. 3, 2014, pp. 848-851.
Chen, Wei et al., "New Requirements of Subjective Video Quality Assessment Methodologies for 3DTV", Video Processing and Quality Metrics 2010 (VPQM), Scottsdale, United States, 2010, 6 pp. total.
Conti, Caroline et al., "Spatial Prediction Based on Self-Similarity Compensation for 3D Holoscopic Image and Video Coding", 2011 18th IEEE International Conference on Image Processing (ICIP), Sep. 11-14, 2011, pp. 961-964.
Curless, Brian et al., "A Volumetric Method for Building Complex Models from Range Images", Proceedings of the 23rd Annual Conference on Computer Graphics and Interactive Techniques, 1996, pp. 1-10.
Donoho, David L., "Compressed Sensing", IEEE Transactions on Information Theory, vol. 52, No. 4, Apr. 2006, pp. 1289-1306.
El-Ghoroury, Hussein S. et al., "Quantum Photonic Imager (QPI): A New Display Technology and Its Applications", Proceedings of the International Display Workshops, vol. 21, Dec. 3, 2014, pp. 1202-1205.
El-Ghoroury, Hussein S. et al., "Quantum Photonic Imager (QPI): A Novel Display Technology that Enables more than 3D Applications", SID Symposium Digest of Technical Papers, vol. 46, No. 1, May 2015, pp. 371-374.
Fehn, Christoph, "A 3D-TV Approach Using Depth-Image-Based Rendering (DIBR)", Proceedings of Picture Coding Symposium, San Francisco, CA, USA, Dec. 2004, 6 pp. total.
Fehn, Christoph, "Depth-Image-Based Rendering (DIBR), Compression and Transmission for a New Approach on 3D-TV", Proc. of SPIE Stereoscopic Displays and Virtual Reality Systems XI, 2004, pp. 93-104.
Forman, Matthew C. et al., "Objective Quality Measurement of Integral 3D Images", Proc. SPIE 4660, Stereoscopic Displays and Virtual Reality Systems IX, 155, 2002, 8 pp. total.
Furihata, Hisayoshi et al., "Novel view synthesis with residual error feedback for FTV", Stereoscopic Displays and Applications XXI, Proceedings of the SPIE-IS&T Electronic Imaging, vol. 7542, Jan. 2010, pp. 75240K-1 to 75240K-12.
Gilliam, Christopher et al., "Adaptive Plenoptic Sampling", 2011 18th IEEE International Conference on Image Processing, 2011, pp. 2581-2584.
Gortler, Steven J. et al., "The Lumigraph", Proceedings of the 23rd Annual Conference on Computer Graphics and Interactive Techniques (SIGGRAPH '96), 1996, pp. 43-52.
Graziosi, Danillo B. et al., "Compression for Full-Parallax Light Field Displays", Proceedings of SPIE—The International Society for Optical Engineering, Feb. 2014, 14 pp. total.
Graziosi, Danillo B. et al., "Compression for Full-Parallax Light Field Displays", Stereoscopic Displays and Applications XXV, Proc. of SPIE-IS&T Electronic Imaging, vol. 9011, Mar. 6, 2014, pp. 90111A-1 to 90111A-14.
Graziosi, Danillo B. et al., "Depth assisted compression of full parallax light fields", Stereoscopic Displays and Applications XXVI, Proceedings of SPIE-IS&T Electronic Imaging, vol. 9391, Mar. 17, 2015, pp. 93910Y-1 to 93910Y-15.

Guenter, Brian et al., "Foveated 3D Graphics", ACM SIGGRAPH Asia, Nov. 2012, 10 pp. total.
Halle, Michael W. et al., "Fast computer graphics rendering for full parallax spatial displays", Proc. SPIE 3011, Practical Holography XI and Holographic Materials III, Apr. 10, 1997, 8 pp. total.
Halle, Michael W., "Multiple Viewpoint Rendering for Three-Dimensional Displays", PhD Thesis, Program in Media Arts and Sciences, School of Architecture and Planning, Massachusetts Institute of Technology, 1997, 164 pp.
Heide, Felix et al., "Adaptive Image Synthesis for Compressive Displays", Proc. of SIGGRAPH 2013 (ACM Transactions on Graphics), vol. 32, No. 4, 2013, 11 pp. total.
Hoffman, David M. et al., "Vergence-accommodation conflicts hinder visual performance and cause visual fatigue", Journal of Vision, vol. 8, No. 3, 2008, pp. 1-30.
Holliman, Nicolas S. et al., "Three-Dimensional Displays: A Review and Applications Analysis", IEEE Transactions on Broadcasting, vol. 57, No. 2, Jun. 2011, pp. 362-371.
Hoshino, H. et al., "Analysis of resolution limitation of integral photography", J. Opt. Soc. Am. A, vol. 15, No. 8, Aug. 1998, pp. 2059-2065.
Hu, Xinda et al., "Design and Assessment of a Depth-Fused Multi-Focal-Plane Display Prototype", Journal of Display Technology, vol. 10, No. 4, Apr. 2014, pp. 308-316.
Hua, Hong et al., "A 3D integral imaging optical see-through head-mounted display", Optics Express, vol. 22, No. 11, May 28, 2014, pp. 13484-13491.
International Organisation for Standardisation, "Call for Proposals on 3D Video Coding Technology", ISO/IEC JTC1/SC29/WG11, MPEG2011/N12036, Geneva, Switzerland, Mar. 2011, 20 pp. total.
International Organisation for Standardisation, "Use Cases and Requirements on Free-viewpoint Television (FTV)", ISO/IEC JTC1/SC29/WG11, MPEG2013/N14104, Geneva, Switzerland, Oct. 2013, 12 pp. total.
International Telecommunication Union, "H.264, Series H: Audiovisual and MultiMedia Systems, Infrastructure of audiovisual services—Coding of moving video, Advanced video coding for generic audiovisual services", ISO/IEC 14496-10:2003, Coding of Audiovisual Objects—Part 10: Advanced Video Coding, ITU-T Recommendation H.264, Mar. 2005, 343 pp.
Isaksen, Aaron et al., "Dynamically Reparameterized Light Fields", Proceedings of the 27th Annual Conference on Computer Graphics and Interactive Techniques (SIGGRAPH '00), 2000, pp. 297-306.
Iwadate, Yuichi et al., "Generating Integral Image from 3D Object by Using Oblique Projection", 18th International Display Workshops 2011 (IDS '11), Dec. 7-9, 2011, pp. 269-272.
Iwasawa, Shoichiro et al., "REI: an automultiscopic projection display", Proceedings of 3DSA2013, Selected paper 1, 2013, pp. 1-4.
Jang, Jae-Young et al., "3D Image Correlator using Computational Integral Imaging Reconstruction Based on Modified Convolution Property of Periodic Functions", Journal of the Optical Society of Korea, vol. 18, No. 4, Aug. 2014, pp. 388-394.
Javidi, Bahram et al., "Three-Dimensional Holographic Image Sensing and Integral Imaging Display", Journal of Display Technology, vol. 1, No. 2, Dec. 2005, pp. 341-346.
Kim, Changil, "Scene Reconstruction from a Light Field", https://graphics.ethz.ch/~kimc/publications/changil-kim-ms-thesis-2010-compressed.pdf, 2010, 72 pp. total.
Koike, T., "Theory, Design, and Application of 4-D Light Field Display", Ph.D. Dissertation, University of Tokyo, Mar. 23, 2009, 133 pp. total.
Kundu, Shinjini, "Light Field Compression Using Homography and 2D Warping", 2012 IEEE International Conference on Acoustics, Speech and Signal Processing (ICASSP), Mar. 25-30, 2012, pp. 1349-1352.
Lanman, Douglas et al., "Near-Eye Light Field Displays", ACM Transactions on Graphics (TOC), vol. 32, Issue 6, Article 220, Nov. 2013, 27 pp. total.
Lee, Cheon et al., "View Synthesis using Depth Map for 3D Video", Proceedings of 2009 APSIPA Annual Summit and conference, Sapporo, Japan, 2009, pp. 350-357.

(56) References Cited

OTHER PUBLICATIONS

Levoy, Marc et al., "Light Field Rendering", Computer Graphics, SIGGRAPH 96 Proceedings, 1996, pp. 31-42.
Lippmann, M. G. , "Epreuves reversibles. Photographies integrales. ", Comptes-Rendus Academie des Sciences, vol. 146, 1908, pp. 446-451.
Liu, Shujie et al., "New Depth Coding Techniques With Utilization of Corresponding Video", IEEE Transactions on Broadcasting, vol. 57, No. 2, Jun. 2011, pp. 551-561.
Lucente, M. , "Computational holograhic bandwidth compression", IBM Systems Journal, vol. 35, Nos. 3&4, 1996, pp. 349-365.
Lucente, Mark , "Diffraction-Specific Fringe Computation for Electro-Holography", Doctoral Thesis Dissertation, MIT Dept. of Electrical Engineering and Computer Science, Sep. 1994, 171 pp. total.
Lucente, Mark , "Holographic bandwidth compression using spatial subsampling", Optical Engineering, Special Section on Electronic Holography, Jun. 1996, pp. 1-25.
Lucente, Mark , "Interactive Computation of Holograms Using a Look-up Table", Journal of Electronic Imaging, vol. 2, No. 1, pp. 28-34, Jan. 1993, 14 pp. total.
Lucente, Mark , "Interactive holographic displays: the first 10 years", Book chapter for "Holography—The First 50 Years", Draft: 2003, 2003, 17 pp. total.
Lucente, Mark , "Interactive three-dimensional holographic displays: seeing the future in depth", for special issue of SIGGRAPH's Computer Graphics publication on Current, New, and Emerging Display Systems, May 1997, 17 pp. total.
Magnor, Marcus et al., "Data Compression for Light-Field Rendering", IEEE Transactions on Circuits and Systems for Video Technology, vol. 10, No. 3, Apr. 2000, pp. 338-343.
Maimone, Andrew et al., "Computational Augmented Reality Eyeglasses", 2013 IEEE International Symposium on Mixed and Augmented Reality (ISMAR), Oct. 1-4, 2013, pp. 29-38.
Maimone, Andrew et al., "Focus 3D: Compressive Accommodation Display", ACM Transactions on Graphics, vol. 32. No. 5, 2013, 13 pp. total.
Malvar, Henrique S. et al., "Lifting-based reversible color transformations for image compression", Proc. of SPIE of Applications of Digital Image Processing, vol. 7073, 2008, pp. 707301-1 to 707301-10.
Marwah, Kshitij et al., "Compressive Light Field Photography using Overcomplete Dictionaries and Optimized Projections", Proc. of SIGGRAPH 2013 (ACM Transactions on Graphics, 32, 4), 2013, 12 pp. total.
Masia, Belen et al., "A survey on computational displays: Pushing the boundaries of optics, computation, and perception", Computers & Graphics, vol. 37, 2013, pp. 1012-1038.
Matsubara, Rie et al., "Light field display simulation for light field quality assessment", Proceedings of the Stereoscopic Displays and Applications Conference XXVI (SPIE-IS&T), vol. 9391, Feb. 9-11, 2015, pp. 93910G-1 to 93910G-15.
Microsoft , "Microsoft HoloLens", downloaded from https://www.microsoft.com/en-us/hololens, admitted prior art, 5 pp. total.
Mori, Yuji et al., "View generation with 3D warping using depth information for FTV", Signal Processing: Image Communication, vol. 24, 2009, pp. 65-72.
Morvan, Yannick et al., "Platelet-based coding of depth maps for the transmission of multiview images", Proceedings of the SPIE, Stereoscopic Displays and Applications, vol. 6055, Feb. 2006, 12 pp. total.
Ng, Ren , "Fourier Slice Photography", ACM Trans. Graph., vol. 24, No. 3, Jul. 2005, pp. 735-744.
Oculus VR, LLC, "Oculus Gear VR", downloaded from https://www.oculus.com/gear-vr/, admitted prior art, 9 pp. total.
Oculus VR, LLC, "Oculus Rift", downloaded from https://www.oculus.com/rift, admitted prior art, 15 pp. total.
Oh, Kwan-Jung et al., "Depth Reconstruction Filter and Down/Up Sampling for Depth Coding in 3-D Video", IEEE Signal Processing Letters, vol. 16, No. 9, Sep. 2009, pp. 747-750.

Oh, Kwan-Jung et al., "Hole-Filling Method Using Depth Based In-Painting for View Synthesis in Free Viewpoint Television (FTV) and 3D Video", Picture Coding Symposium (PCS) 2009, May 6-8, 2009, 4 pp. total.
Ohm, Jens-Rainer , "Overview of 3D Video Coding Standardization", Proceedings of the Three Dimensional Systems and Applications (3DSA) International Conference 2013, 2013, pp. 1-4.
Olsson, Roger et al., "A Combined Pre-Processing and H.264-Compression Scheme for 3D Integral Images", 2006 IEEE International Conference on Image Processing, 2006, pp. 513-516.
Olsson, Roger et al., "A Depth Dependent Quality Metric for Evaluation of Coded Integral Imaging Based 3D-Images", 3DTV Conference, 2007, 4 pp.
Park, Jae-Hyeung et al., "Recent progress in three-dimensional information processing based on integral imaging", Applied Optics, vol. 48, No. 34, Dec. 1, 2009, pp. H77-H94.
Piao, Yan et al., "Sub-sampling Elemental Images for Integral Imaging Compression", International Conference on Audio Language and Image Processing (ICALIP), 2010, pp. 1164-1168.
Razavi, R et al., "Low-delay video control in a personal area network for augmented reality", IET Image Processing, vol. 2, No. 3, 2008, pp. 150-162.
Reed, Nathan, "Depth Precision Visualized", retrieved online at https://developer.nvidia.com/content/depth-precision-visualized, Jul. 15, 2015, 11 pp. total.
Shi, Shasha et al., "Efficient Compression Method for Integral Images Using Multi-View Video Coding", 2011 18th IEEE International Conference on Image Processing, 2011, pp. 137-140.
Shum, Heung-Yeung et al., "Survey of Image-Based Representations and Compression Techniques", IEEE Transactions on Circuits and Systems for Video Technology, vol. 13, No. 11, Nov. 2003, pp. 1020-1037.
Sjostrom, Marten et al., "Improved Depth-Image-Based Rendering Algorithm", 3DTV Conference: The True Vision—Capture, Transmission and Display of 3D Video (3DTV-CON), 2011, 4 pp. total.
Sloan, Peter-Pike et al., "Time Critical Lumigraph Rendering", Proceedings of the 1997 ACM SIGGRAPH Symposium on Interactive 3D Graphics, 1997, 7 pp. total.
Smolic, Aljoscha et al., "Coding Algorithms for 3DTV—A Survey", IEEE Transactions on Circuits and Systems for Video Technology, vol. 17, No. 11, Nov. 2007, pp. 1606-1621.
Solh, Mashhour et al., "Depth Adaptive Hierarchical Hole-Filling for DIBR-Based 3D Videos", Proceedings of the SPIE, Three-Dimensional Image Processing (3DIP) and Applications II, vol. 8290, 2012, pp. 829004-1 to 829004-11.
Sullivan, Gary J. et al., "The H.264/AVC Advanced Video Coding Standard: Overview and Introduction to the Fidelity Range Extensions", SPIE Conference on Applications of Digital Imaging Processing XXVII, Special Session on Advances in the New Emerging Standard: H.264/AVC, Aug. 2004, pp. 1-21.
Sutherland, Ivan E. , "A head-mounted three dimensional display", 1968 International Workshop on Managing Requirements Knowledge, 1968, pp. 757-564.
Takahashi, Keita , "Theoretical Analysis of View Interpolation With Inaccurate Depth Information", IEEE Transactions on Image Processing, vol. 21, No. 2, Feb. 2012, pp. 718-732.
Takaki, Yasuhiro , "High-Density Directional Display for Generating Natural Three-Dimensional Images", Proceedings of the IEEE, vol. 94, No. 3, Mar. 2006, pp. 654-663.
Tanimoto, Masayuki et al., "Reference Software of Depth Estimation and View Synthesis for FTV/3DV", International Organisation for Standardisation, ISO/IEC JTC1/SC29/WG11, MPEG2008/M15836, Busan, Korea, Oct. 2008, 5 pp. total.
Texas Instruments, "DLP Technology for Near Eye Display, Application Report", Literature No. DLPA051A, available online at http://www.ti.com/lit/wp/dlpa051a/dlpa051a.pdf, Sep. 2014, 18 pp. total.
Tian, Dong et al., "View Synthesis Techniques for 3D Video", Applications of Digital Image Processing XXXII, Proceedings of the SPIE, vol. 7443, 2009, pp. 74430T-1 to 74430T-11.
Urey, Hakan et al., "State of the Art in Stereoscopic and Autostereoscopic Displays", Proceedings of the IEEE, vol. 99, No. 4, Apr. 2011, pp. 540-555.

(56) References Cited

OTHER PUBLICATIONS

Vetro, Anthony et al., "Overview of the Stereo and Multiview Video Coding Extensions of the H.264/MPEG-4 AVC Standard", Proceedings of the IEEE, vol. 99, No. 4, Apr. 2011, pp. 626-642.
Walls, Frederick et al., "VESA Display Stream Compression", Downloaded at http://www.vesa.org/wp-content/uploads/2014/04/VESA_DSC-ETP200.pdf, Mar. 3, 2014, pp. 1-5.
Wang, Zhou et al., "Image Quality Assessment: From Error Visibility to Structural Similarity", IEEE Transactions on Image Processing, vol. 13, No. 4, Apr. 2004, pp. 600-612.
Wegner, Krzysztof et al., "Enhanced View Synthesis Reference Software (VSRS) for Free-viewpoint Television", International Organisation for Standardisation, ISO/IEC JTC1/SC29/WG11, MPEG2013/M31520, Geneva, Switzerland, Oct. 2013, 4 pp. total.
Wetzstein, Gordon et al., "Compressive Light Field Displays", IEEE Computer Graphics and Applications, vol. 32, Issue 5, Sep./Oct. 2012, pp. 6-11.
Wetzstein, Gordon et al., "Tensor Displays: Compressive Light Field Synthesis using Multilayer Displays with Directional Backlighting", 2012 Proceedings of ACM SIGGRAPH Transactions on Graphics (TOG), vol. 31, Issue 4, Article 80, Jul. 2012, 11 pp. total.
Wikipedia, "List of refractive indices", https://en.wikipedia.org/wiki/List_of_refractive_indices, Dec. 7, 2003, 5 pp.
X Company, "Glass", downloaded from http://www.google.com/glass/start/, which redirects to https://x.company/glass/, admitted prior art, 6 pp. total.
Yan, P. et al., "Integral image compression based on optical characteristic", IET Computer Vision, vol. 5, No. 3, 2011, pp. 164-168.
Yang, Lu et al., "Artifact reduction using reliability reasoning for image generation of FTV", Journal of Visual Communication and Image Representation, vol. 21, 2010, pp. 542-560.
Yang, Lu et al., "Error Suppression in View Synthesis Using Reliability Reasoning for FTV", 3DTV Conference: The True Vision—Capture, Transmission and Display of 3D Video (3DTV-CONO), Jun. 2010, 4 pp. total.
Yi, Faliu et al., "Fast 3D Computational Integral Imaging Using Graphics Processing Unit", Journal of Display Technology, vol. 8, No. 12, Dec. 2012, pp. 714-722.
Yi, Faliu et al., "Simultaneous reconstruction of multiple depth images without off-focus points in integral imaging using a graphics processing unit", Applied Optics, vol. 53, No. 13, May 1, 2014, pp. 2777-2786.
Yoo, Hoon, "Artifact analysis and image enhancement in three-dimensional computational integral imaging using smooth windowing technique", Optics Letters, vol. 36, No. 11, Jun. 1, 2011, pp. 2107-2109.
Zhang, Cha et al., "Compression of Lumigraph with Multiple Reference Frame (MRF) Prediction and Just-in-time Rendering", Proceeding of the 2000 Data Compression Conference, DCC 2000 Snowbird, UT, USA; Mar. 28-30, 2000, Los Alamitos, CA, USA; IEEE Comput. Soc., Mar. 28, 2000, pp. 253-262.
Zhao, Yin et al., "Boundary Artifact Reduction in View Synthesis of 3D Video: From Perspective of Texture-Depth Alignment", IEEE Transactions on Broadcasting, vol. 57, No. 2, Jun. 2011, pp. 510-522.
Zhao, Yin et al., "Suppressing Texture-Depth Misalignment for Boundary Noise Removal in View Synthesis", 28th Picture Coding Symposium, PSC2010, Nagoya, Japan, Dec. 8-10, 2010, pp. 30-33.

\* cited by examiner

FIG. 7 left_disp = hole left border disparity
right_disp = hole right border disparity

METHODS FOR FULL PARALLAX COMPRESSED LIGHT FIELD SYNTHESIS UTILIZING DEPTH INFORMATION

CROSS-REFERENCE TO RELATED APPLICATIONS

This application is a continuation of International Application No. PCT/US2016/028710 filed Apr. 21, 2016 which claims the benefit of U.S. Provisional Patent Application No. 62/151,616 filed Apr. 23, 2015.

BACKGROUND OF THE INVENTION

1. Field of the Invention

This invention relates generally to image and video synthesis, more particularly to the synthesis of light field image data used as input for light field 3D imaging systems. The term "light field" describes the transmission and modulation of the light including, direction, amplitude, frequency and phase, therefore encapsulates imaging systems that utilize techniques such as holography, integral imaging, stereoscopy, multi-view imaging, Free-viewpoint TV (FTV) and the like.

2. Prior Art

Light Field displays modulate the light's intensity and direction for reconstructing the 3D objects of a scene without requiring specialized glasses for viewing. In order to accomplish this, light field displays usually utilize a large number of views, which imposes several challenges in the acquisition and transmission stages of the 3D processing chain. Compression is a necessary tool to cope with the huge data sizes involved, and commonly systems sub-sample the views at the generation stage and reconstruct the absent views at the display. For example, in Yan et al., "Integral image compression based on optical characteristic," *Computer Vision, IET*, vol. 5, no. 3, pp. 164, 168 (May 2011) and Yan Piao et al., "Sub-sampling elemental images for integral imaging compression," 2010 *International Conference on Audio Language and Image Processing (ICALIP)*, pp. 1164, 1168 (23-25 Nov. 2010), the authors perform sub-sampling of elemental image based on the optical characteristics of the display system. A more formal approach to light field sampling can be found in the works of Jin-Xiang Chai et al., (2000) Plenoptic sampling, in *Proceedings of the 27th annual conference on Computer graphics and interactive techniques* (SIGGRAPH '00) and Gilliam, C. et al., "Adaptive plenoptic sampling", 2011 18*th IEEE International Conference on Image Processing (ICIP)*, pp. 2581, 2584 (11-14 Sep. 2011). In order to reconstruct the views at the display side, several different methods can be used from computer graphics methods to image-based rendering.

In computer graphics, the act of creating a scene or a view of a scene is known as view rendering. Usually, a complex 3D geometrical model incorporating lighting and surface properties from the camera point of view is used. This view rendering generally requires multiple complex operations and a detailed knowledge of the scene geometry. Alternatively, Image-Based Rendering (IBR) replaces the use of complex 3D geometrical models with the use of multiple surrounding viewpoints to synthesize views directly from input images that oversample the light field. Although IBR generates more realistic views, it requires a more intensive data acquisition process, data storage, and redundancy in the light field. To reduce the data handling penalty, Depth Image-Based Rendering (DIBR) uses depth information from the 3D geometrical model to reduce the number of required IBR views. (See U.S. Pat. No. 8,284,237, "View Synthesis Reference Software (VSRS) 3.5," wg11.sc29.org, March 2010, and C. Fehn, "3D-TV Using Depth-Image-Based Rendering (DIBR)," in Proceedings of Picture Coding Symposium, San Francisco, Calif., USA, December 2004.) Each view has a depth associated with each pixel position, known as depth maps, which are then used to synthesize the absent views.

Figure 1:
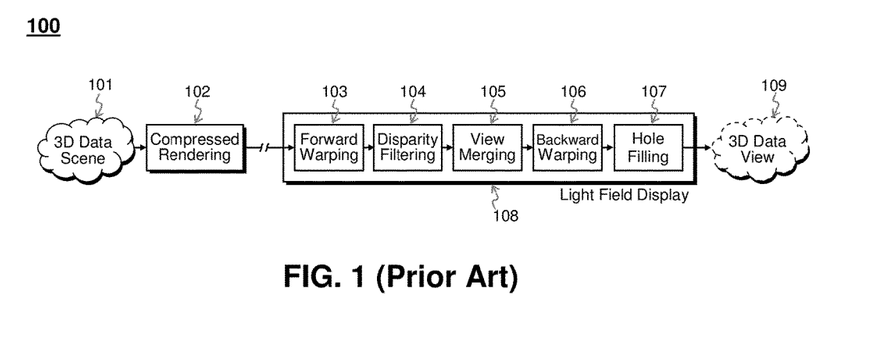
FIG. 1 illustrates the three main steps of depth-image based rendering for a compressed light field display system.

DIBR methods, like the ones depicted in FIG. 1, usually have three distinct stages: namely, view warping (or view projection), view merging 105 and hole filling 107. View warping is the reprojection of a scene captured by one camera to the image plane of another camera. This process utilizes the geometry of the scene, provided by the per-pixel depth information within the reference view, and the characteristics of the capturing device, i.e., the intrinsic (focal length, principal point) and extrinsic (rotation, 3D position) parameters of the camera (C. Fehn, "3D-TV Using Depth-Image-Based Rendering (DIBR)," in Proceedings of Picture Coding Symposium, San Francisco, Calif., USA, December 2004). The projection can be done in two separate stages: a forward warping 103 stage, projecting only the disparity values, and a backward warping stage 106, fetching the color value from the references. Since disparity warping can be affected by rounding and depth quantization, an optional disparity filtering 104 block can be added to the system to correct erroneous warped disparity values.

After one reference view is warped, parts of the target image might still be unknown. Since objects at different depths move with different apparent speeds, part of the scene hidden by one object in the reference view may be disoccluded in the target view, while the color information of this part of the target view is not available from the reference. Typically, multiple references are used to try to cover the scene from multiple view points, so that disoccluded parts of one reference can be obtained from another reference image. With multiple views, not only the disoccluded parts of the scene can come from different references, but also parts of the scene can be visualized by multiple references at the same time. Hence, the warped views of the references may be complementary and overlapping at the same time. View merging 105 is the operation of bringing these multiple views together into one single view. If pixels from different views are mapped to the same position, the depth value is used to determine the dominant view, which will be given by either the closest view or an interpolation of several views.

Even with multiple views, the possibility exists that part of the scene visualized at the target view has no correspondence to any color information in the reference views. Those positions lacking color information are called holes, and several hole filling 107 methods have been proposed to fill these holes with color information from surrounding pixel values. Usually holes are generated from object disocclusion, and the missing color is highly correlated to the background color. Several methods to fill in the holes according to the background information have been proposed (Kwan-Jung Oh et al., "Hole filling method using depth based in-painting for view synthesis in free viewpoint television and 3-D video," *Picture Coding Symposium*, 2009. PCS 2009, pp. 1, 4, 6-8, May 2009).

Due to the limitation of the display devices resolution, DIBR methods have not been satisfactorily applied to full parallax light field images. However, with the advent of high resolution display devices having very small pixel pitch (U.S. Pat. No. 8,567,960), view synthesis of full parallax light fields using DIBR techniques is feasible.

Levoy et al used light ray interpolation between two parallel planes to capture a light field and reconstruct its view points (Marc Levoy et al., (1996) "Light field rendering" in *Proceedings of the 23rd annual conference on Computer graphics and interactive techniques* (SIGGRAPH '96)). However, to achieve realistic results, this approach requires huge amounts of data to be generated and processed. If the geometry of the scene, specifically depth, is taken into account, then a significant reduction in data generation and processing can be realized.

In Steven J. Gortler et al., (1996) "The lumigraph" in *Proceedings of the 23rd annual conference on Computer graphics and interactive techniques* (SIGGRAPH '96), the authors propose the use of depth to correct the ray interpolation, and in Jin-Xiang Chai et al., (2000) "Plenoptic sampling" in *Proceedings of the 27th annual conference on Computer graphics and interactive techniques* (SIGGRAPH '00) it was shown that the rendering quality is proportional to the number of views and the available depth. When more depth information is used, fewer references are needed. Disadvantageously, though, depth image based rendering methods have been error prone due to inaccurate depth values and the precision limitation of the synthesis methods.

Depth acquisition is a complicated problem by itself. Usually systems utilize an array of cameras, and the depth of an object can be estimated by corresponding object features at different camera positions. This approach is prone to errors due to occlusions or smooth surfaces. Lately, several active methods for depth acquisition have been used, such as depth cameras and time-of-flight cameras. Nevertheless, the captured depth maps still present noise levels that despite low amplitude adversely affect the view synthesis procedure.

In order to cope with inaccurate geometry information, many methods apply a pre-processing step to filter the acquired depth maps. For example, in Kwan-Jung Oh et al., "Depth Reconstruction Filter and Down/Up Sampling for Depth Coding in 3-D Video," *Signal Processing Letters, IEEE*, vol. 16, no. 9, pp. 747,750 (September 2009), a filtering method is proposed that smoothes the depth map while enhancing its edges. In Shujie Liu et al., "New Depth Coding Techniques With Utilization of Corresponding Video", *IEEE Transactions on Broadcasting*, vol. 57, no. 2, pp. 551, 561, (June 2011), the authors propose a trilateral filter, which adds the correspondent color information to the traditional bilateral filter to improve the matching between color and depth. Nevertheless, the pre-processing of depth information does not eliminate synthesis artifacts and can be computationally intensive and impractical for low-latency systems.

A problem for view merging is the color mismatch between views. In Yang L et al., (2010) "Artifact reduction using reliability reasoning for image generation of FTV" J Vis Commun Image Represent, vol 21, pp 542-560 (July-August 2010), the authors propose the warping of a reference view to another reference view position in order to verify the correspondence between the two references. Unreliable pixels, that is, pixels that have a different color value in the two references, are not used during warping. In order not to reduce the number of reference pixels, the authors from "Novel view synthesis with residual error feedback for FTV," in Proc. Stereoscopic Displays and Applications XXI, vol. 7524, January 2010, pp. 75240L-1- 12 (H. Furihata et al.) propose the use of a color correcting factor obtained from the difference between the corresponding pixels in the two reference views. Although the proposed method improved rendering quality, the improvement came at the cost of increased computational time and memory resources to check pixel color and depth.

Since prior-art synthesis methods are optimized for reference views close to each other, DIBR methods are less effective for light field sub-sampling, wherein reference views are further apart from each other. Furthermore, to reduce the data handling load, prior-art methods for view synthesis usually target horizontal parallax views only; vertical parallax information is left unprocessed.

In the process of 3D coding standardization (ISO/IEC JTC1/SC29/WG11, Call for Proposals on 3D Video Coding Technology, Geneva, Switzerland, March 2011), view synthesis is being considered as part of the 3D display processing chain, since it allows the decoupling of the capturing and the display stages. By incorporating view synthesis at the display side, fewer views need to be captured.

Figure 2:
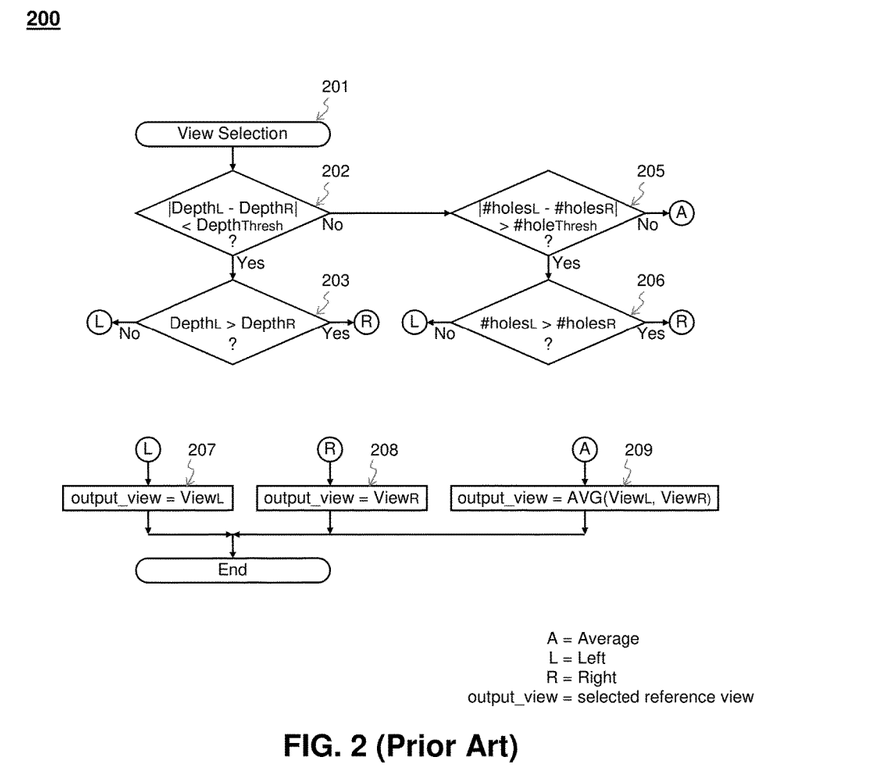
FIG. 2 is the flowchart of an adaptive merging procedure used in the prior art.

While the synthesis procedure is not part of the norm, the MPEG group provides a View Synthesis Reference Software (VSRS, U.S. Pat. No. 8,284,237) to be used in the evaluation of 3D video systems. The VSRS software implements state-of-the-art techniques for view synthesis, including all three stages: view warping, view merging and hole filling. Since VSRS can be used with any kind of depth (including ground-truth depth maps obtained from computer graphics models up to estimated depth maps from stereo pair images), many sophisticated techniques were incorporated to adaptively deal with depth maps imperfections and synthesis inaccuracies. For example, FIG. 2 shows the flowchart of the adaptive merging operation adopted by VSRS. For the synthesis, only two views are used to determine the output 201, a left view and a right view. First, the absolute value of the difference between left and right depths is compared to a pre-determined threshold 202. If this difference is larger than a pre-defined threshold (indicating that the depth values are very different from each other, and possibly related to objects in different depth layers), then the smallest depth value 203 determines the object that is closer to the camera, and the view is assumed to be either the left view 207, or the right view 208. In case the depth values are close to each other, then the number of holes is used to determine the output view. The absolute difference between the number of holes in the left and right views is compared 205 to a pre-determined threshold. In case both views have a similar number of holes, then an average 209 of the pixels coming from both views is used. Otherwise, the view with fewer holes 206 is selected as the output view. This procedure is effective for unreliable warped pixels, it detects wrong values and rejects them, but at the same time requires a high computational cost, since a complicated view analysis (depth comparison and hole counting) is done for each pixel separately.

Figure 3:
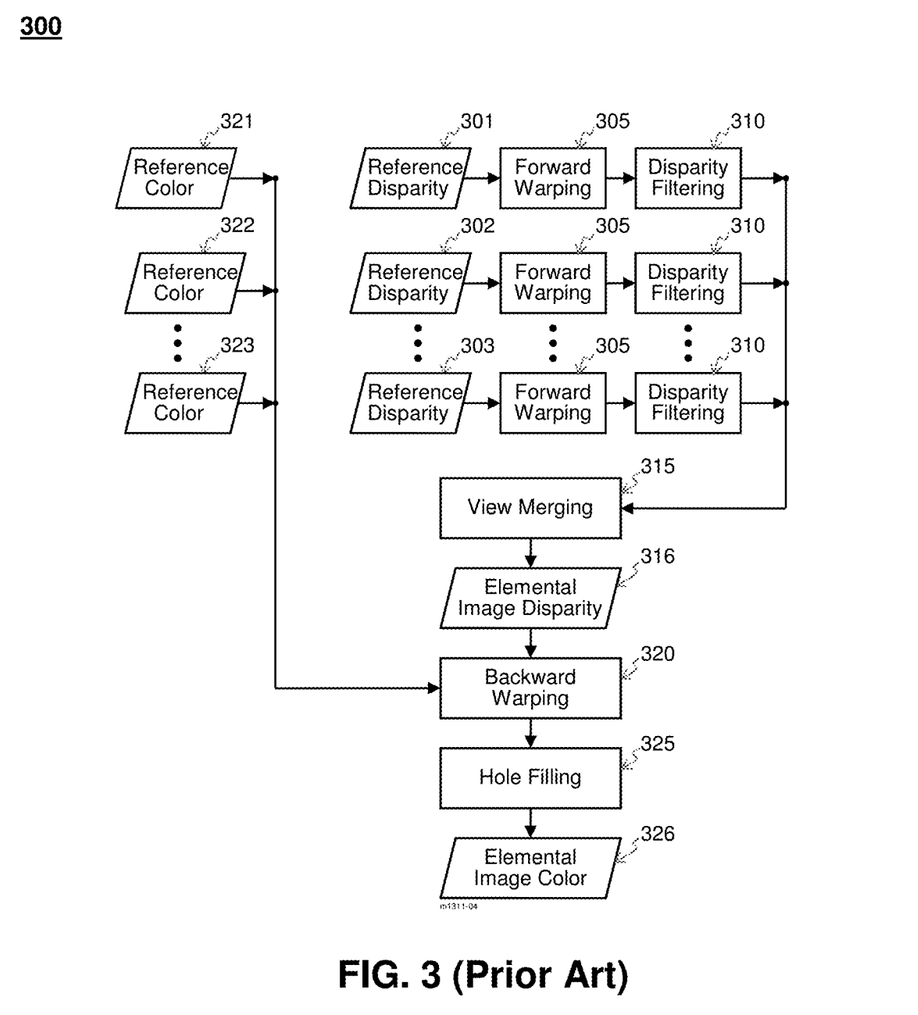
FIG. 3 is the flowchart of the method in Graziosi et al., "Depth assisted compression of full parallax light fields", IS&T/SPIE Electronic Imaging. International Society for Optics and Photonics (Mar. 17, 2015), on which this invention is based.

VSRS uses horizontal camera arrangement and utilizes only two references. It is optimized for synthesis of views with small baselines (that is, views that are close to each other). It does not use the vertical camera information and is not suited to be used in light field synthesis. In Graziosi et al., "Depth assisted compression of full parallax light fields", IS&T/SPIE Electronic Imaging. International Society for Optics and Photonics (Mar. 17, 2015), a synthesis method that targets light fields and uses both the horizontal and vertical information was introduced. The method called MR-DIBR (Multiple Reference Depth-Image Based Rendering) is depicted in FIG. 3 and utilizes multiple references 321, 322 and 323 with associated disparities 301, 302 and 303 to render the light field. At first, the disparities are forward warped 305 to the target position. Next, a filtering method 310 is applied to the warped disparities to mitigate artifacts such as cracks caused by inaccurate pixel displacement. The following step is to merge 315 all the filtered warped disparities. Pixels with smaller depth (closest to the viewer) are selected. VSRS blends color information from two views with similar depth values and obtains a blurred synthesized view; in contrast, the invention in Graziosi et al., "Depth assisted compression of full parallax light fields", IS&T/SPIE Electronic Imaging. International Society for Optics and Photonics (Mar. 17, 2015) utilizes only one view after merging to preserve the high resolution of the reference view. Moreover, rendering time is reduced due to simple copying of the color information from only one reference rather than interpolating several references. Finally, the merged elemental image disparity 308 is used to backward warp 320 the color from the references' colors 321, 322 or 323 and generate the final synthesized elemental image 326.

The view merging algorithm exhibits quality degradation when the depth values from the reference views are inaccurate. Methods for filtering depth values have been proposed U.S. Pat. No. 8,284,237, C. Fehn, "3D-TV Using Depth-Image-Based Rendering (DIBR)," in Proceedings of Picture Coding Symposium, San Francisco, Calif., USA, (December 2004), and Kwan-Jung Oh et al., "Depth Reconstruction Filter and Down/Up Sampling for Depth Coding in 3-D Video", *Signal Processing Letters, IEEE*, vol. 16, no. 9, pp. 747, 750, (September 2009), but they increase the computational requirements of the system and can increase the latency of the display system.

BRIEF DESCRIPTION OF THE DRAWINGS

In the following description, like drawing reference numerals are used for the like elements, even in different drawings. Also, functions well-known in the field are not described in detail, since they would obscure the invention with unnecessary detail.

DETAILED DESCRIPTION OF THE PREFERRED EMBODIMENTS

It is the purpose of this invention to disclose a method for view merging that can cope with depth inaccuracies and obtain a high-quality synthesized view with fewer computational resources. The current invention introduces innovative view merging methods for light field synthesis in order to overcome the drawbacks of prior art. Additional objectives and advantages of this invention will become apparent from the following detailed description.

In the present invention the light field is arranged in a 2D matrix of camera views, each of which is called an "elemental image". The camera views are identical to each other and arranged in the same depth plane with horizontal and vertical displacements only. For horizontally and vertically aligned views, view warping (projection) can be done by horizontal and vertical pixel shifting. The elemental image is normally integrated into the display architecture. For example, in lens based imaging systems, the elemental images are situated under a lenset or a micro-lens that modulates the elemental image directionally.

Figure 4:
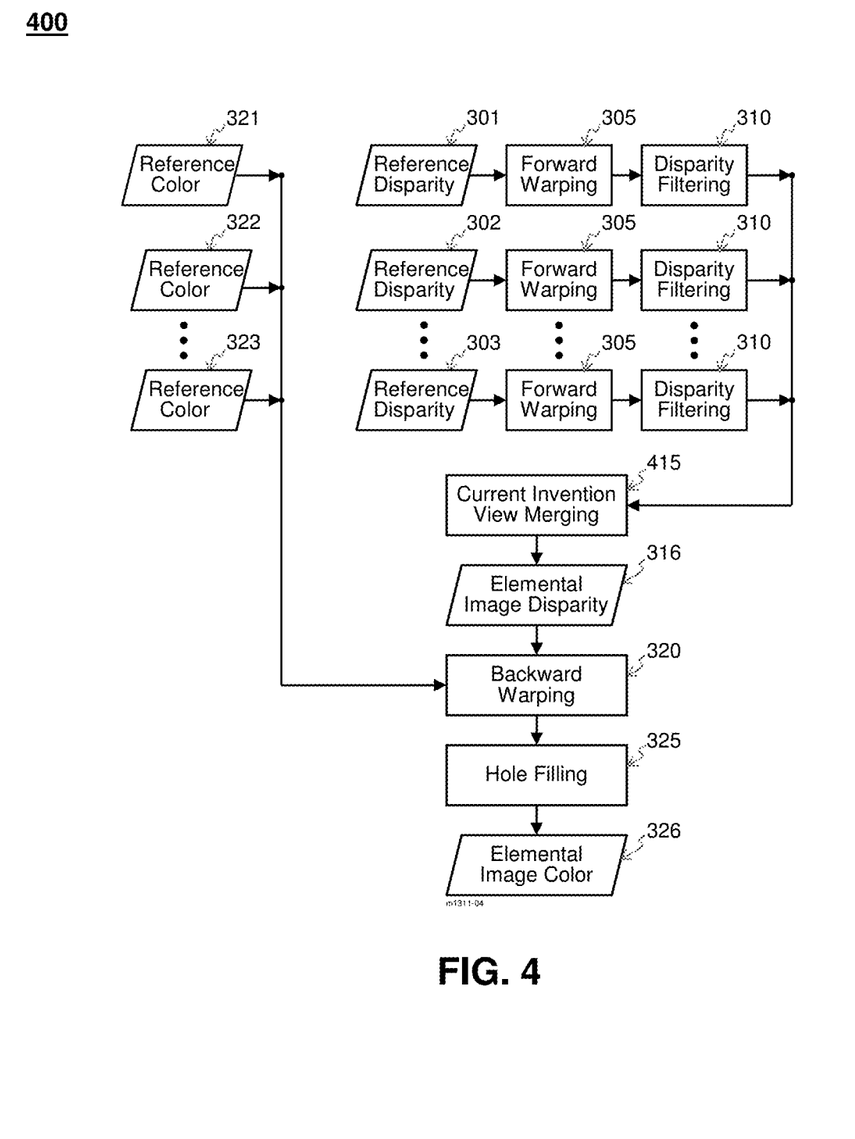
FIG. 4 is the flowchart of a multiple reference depth-image based rendering (MR-DIBR) method of this invention.

The merge operation used in MR-DIBR is adversely affected by inaccurate depth values resulting in warped (reprojected) views not matching. When the merge is done, the views closer to the camera get used, but because the depth value is wrong, the merged result may have wrong color values. Another problem is, since the closest camera always wins, the reference view selection changes when the depth values are similar to each other but differing by noise. When the reference view color images have different brightness, artifacts in the merged color are created from changing from one reference to another. Furthermore, holes might still be visible after the merge operation. Therefore, it is the objective of this invention to improve the method disclosed in Graziosi et al., "Depth assisted compression of full parallax light fields", IS&T/SPIE Electronic Imaging, International Society for Optics and Photonics (Mar. 17, 2015) by modifying the view merging 415 and including an efficient hole filling procedure 325, as depicted in FIG. 4.

Figure 5:
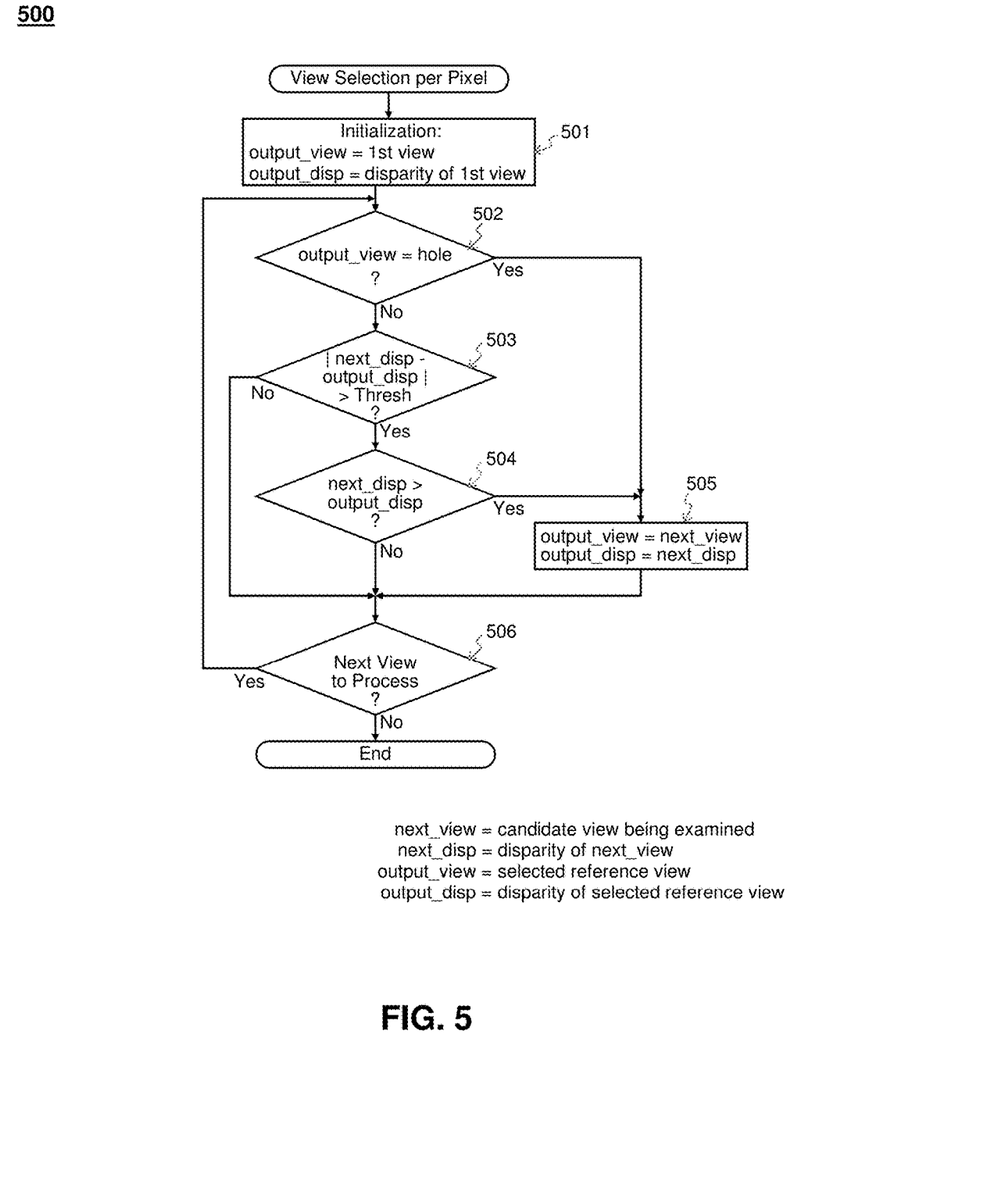
FIG. 5 depicts an embodiment of a view selection method per pixel of this invention.
Figure 6:
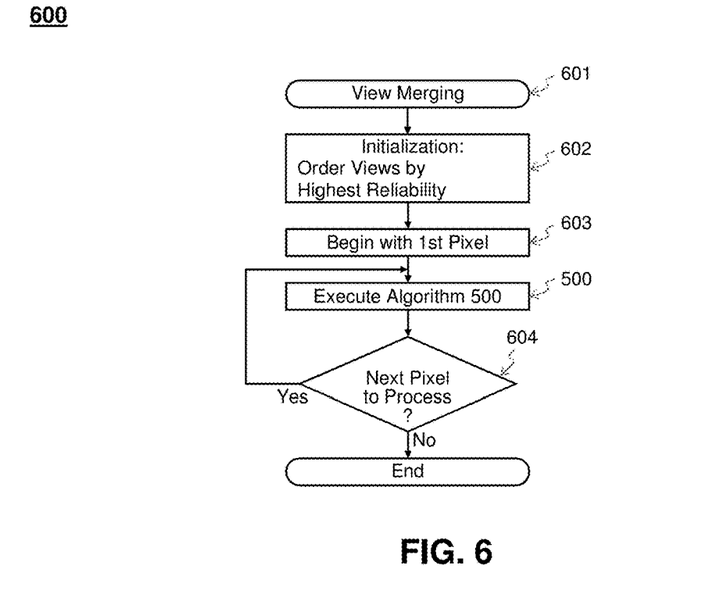
FIG. 6 depicts an embodiment of a view merging method of this invention.

In one embodiment of this invention a method for view merging is described. The flowchart of the procedure is depicted in FIG. 5 and FIG. 6. For each pixel, the reference views will be tested and only one view will be determined as the output view 601. In order to compare the values from different views, they are first ordered according to their reliability score 602, which is objectively quantified by calculating the depth histogram of the warped view and averaging the N highest values using the frequency as weighting factors, as indicated by Equation (1). N is an empirically defined image dependent system parameter.

$$\text{View Reliability Score} = \sum_{i=1}^{N} disp(i) \times freq(disp(i)) \quad (1)$$

For each pixel 603, a process that selects the best view 500 is executed until there are no more pixels to process 604. The process of view selection is depicted in FIG. 5. The procedure starts electing the view with highest score to initialize the output of the merge operation 501. The next view from the ordered list is selected and its disparity is chosen as a candidate disparity to be compared with the current output disparity value. When the current disparity value indicates a hole position 502, the output is assigned the disparity value of the current view, and the new disparity will be stored in that position 505. When the current position already has a disparity value, the absolute difference between the current disparity and the candidate disparity is compared to a given threshold 503, which is an empirically defined, reference view dependent, system parameter that controls the stability of the merging operation. By adding the disparity check, adjusting the threshold value, and prioritizing the use of the most reliable view, view selection becomes more stable in the merging operation. When the difference is larger than the given threshold, a second test 504 is performed to check which disparity is larger. In case the candidate disparity is larger than the current disparity, the output disparity value is updated, as well as the output view 505. All the reference views are tested similarly 506.

Figure 7:
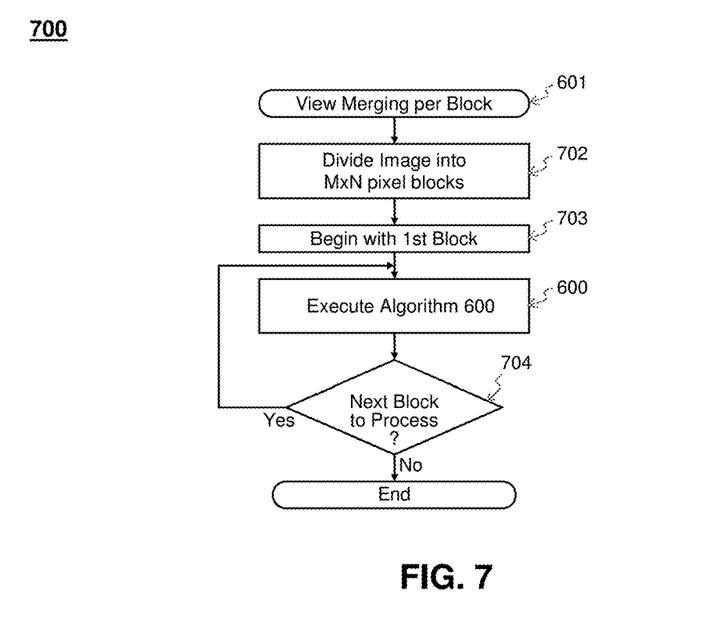
FIG. 7 illustrates an embodiment of a view merging method of this invention applied to block processing.

The merging operation depicted in FIG. 7 divides the input warped images into MxN blocks of pixels 702 prior to the algorithm 600 execution. Since the processing of each block is independent from each other, it can be done conveniently on a display with parallel processors. Otherwise, on a single processor, this procedure is repeated until all blocks are processed 704. For single processor operation, dividing the image into blocks can be beneficial if the block-by-block reliability varies across the image, because it results in having more accurate reliability estimates.

The reliability score can be determined by a hole count in the block. The merge results can be further improved by a post-filter, such as the H.264/AVC video compression standard deblocking filter (ISO/IEC 14496-10:2003, "Coding of Audiovisual Objects—Part 10: Advanced Video Coding," 2003, also ITU-T Recommendation H.264 "Advanced video coding for generic audiovisual services"). Color mismatches can be adjusted at a block level, where the block luminance of neighboring blocks are compared and the color levels are adjusted according to the neighboring color levels. Furthermore, the synthesis operation can utilize information from neighboring blocks to maintain view consistency in the merge operation, and avoid possible artifacts due to view switching. To achieve a more accurate view evaluation, another possible embodiment of this invention uses adaptive block sizes, e.g., taking into account the number of holes per block.

Figure 8:
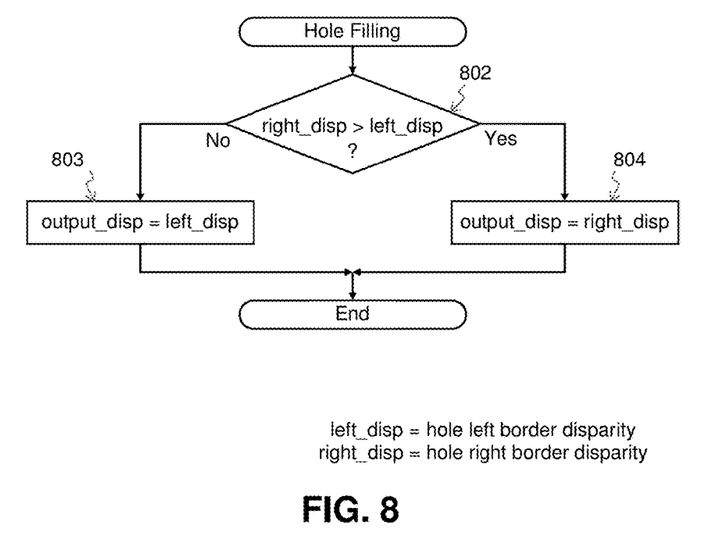
FIG. 8 illustrates an embodiment of a hole filling method of this invention.
Figure 9:
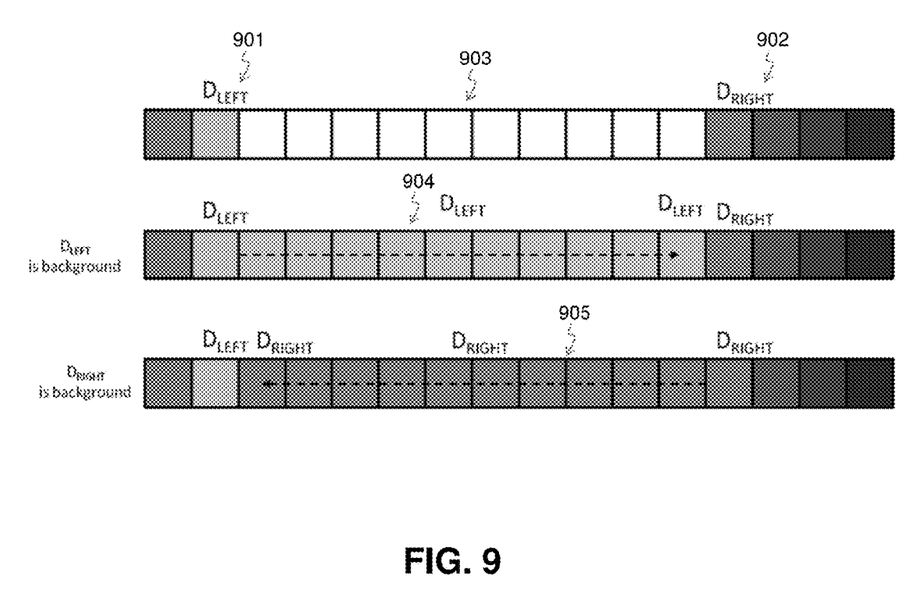
FIG. 9 depicts different options of hole filling methods of this invention.

Although there are many methods for hole filling, a big concern is the complexity of the hole filling algorithms. This invention adopts a simple hole filling procedure based on horizontal background extensions. FIG. 8 and FIG. 9 illustrate the technique adopted by an embodiment of this invention. During backward warping, when a hole is encountered 903, the depth at the left border 901 and depth at the right border 902 of the hole is obtained. The two depths are compared 802, and if the depth on the left represents a background depth (that is, a depth value that is further away from the camera), then the color value of the reference indicated by the pixel at the left border of the hole is copied 804 throughout the hole 904. If the opposite occurs, and the right value is related to the background, and the color value of the reference from the right border of the hole is copied 803 throughout the hole 905. Since the color extension ignores the presence of patterns or vertical color changes, this procedure could lead to background artifacts. However, these artifacts have lesser impact on the perceived image quality, since in the case of light fields, viewer images are generated by multiple pixels from multiple elemental images and not from just one single elemental image. Erroneous hole filling has a greater impact on the motion parallax of the display than on the perceived image quality, and usually affects acute viewing angles more than the central viewing angle. Hence, artifacts caused by erroneous hole filling have a lower impact on the viewer experience.

It should be noted that both depth and disparity have been referred to in this disclosure. Depth and disparity are related parameters, and either may generally be replaced with the other in this disclosure and in the claims to follow in accordance with the following equation:

$$Z = fB/d$$

where: Z is the depth value, f is the focal distance, B is the baseline (i.e., the distance between the reference camera's position and the position that the camera is being projected to) and d is the disparity.

Those skilled in the art will readily appreciate that various modifications and changes can be applied to the embodiments of the invention without departing from its scope defined in and by the appended claims. For example, alternative methods may be used to obtain the view reliability scores. It should be appreciated that the foregoing examples of the invention are illustrative only, and that the invention can be embodied in other specific forms without departing from the spirit or essential characteristics thereof.

What is claimed is:

1. A method for synthesis of a light field from a data set representing a plurality of predetermined views and respective disparity values comprising:
   a) projecting the plurality of predetermined views using the respective disparity values to a single view position to provide a number of predetermined views at the single view position that is equal to the number of the predetermined views;
   b) merging the plurality of predetermined views to define a merged view, wherein the merging includes;
      i) evaluating each of the plurality of predetermined views to determine an apparent reliability of each predetermined view;
      ii) for each pixel, selecting the most apparently reliable view not previously selected and using the respective disparity value or noting a position of a hole;
      iii) again selecting the most apparently reliable view not previously selected and filling holes found in ii) if hole filling pixels are present;
      iv) repeating ii) and iii) for still further predetermined views until all predetermined views have been processed; and
   c) performing a hole-filling operation on the merged view to define a synthesized light field for display.

2. The method of claim 1 wherein the projecting the plurality of predetermined views that is different from the position of any of the plurality of predetermined views using the respective disparity values to a single view position.

3. The method of claim 1 wherein for each pixel for which a disparity value has been used in b) ii), replacing that disparity value as part of b) iii) as if filling a hole if that replacement disparity is larger than the disparity value used in b) ii).

4. The method of claim 1, further comprising:
   determining a threshold based on noise in the respective disparity values; and
   for each pixel in the most reliable view selected in b), ii), the respective disparity value for any respective pixel is used only if the absolute value of difference in the respective disparity and the disparity for the respective pixel of the next most reliable view is less than the threshold, otherwise the larger of the two disparities is used as the disparity of the respective pixel.

5. The method of claim 1 wherein the plurality of predetermined views are selected from a number of views greater than the predetermined plurality of views.

6. The method of claim 1 wherein a data set representing a plurality of predetermined views includes an identification of the position of each of the predetermined views, and wherein the position of at least one of the predetermined views is determined by analysis of the view.

7. The method of claim 1 wherein in b), i), the apparent reliability of each predetermined view is determined by finding a frequency of occurrence of each disparity in the respective view, and establishing the apparent reliability responsive to a weighted sum of N most frequent disparities, wherein the weights are provided as values of the disparity's repetition in the respective view, wherein the same value of N is used for all predetermined views, and N is selected responsive to a number of different disparity values in a warped view.

8. The method of claim 1 wherein the hole filling operation of c) comprises comparing pixels at opposite boundaries of the hole and filling the hole by repeating the pixel of a boundary representing a background relative to the opposite boundary.

9. The method of claim 8 wherein the opposite boundaries are opposite boundaries along a horizontal line in the merged view.

10. The method of claim 1 wherein between a) and b), the method further comprises dividing the projected plurality of predetermined views into M by N blocks of pixels, and then completing b) and c), block by block.

11. The method of claim 10 wherein a size of the M by N blocks is adaptive based on the number of holes in the blocks after completing b) and c), block by block.

12. The method of claim 10 wherein after c), the synthesized light field is subjected to further processing.

13. The method of claim 12 wherein the further processing includes comparing block luminance of neighboring blocks and adjusting color levels according to neighboring color levels.

14. The method of claim 12 wherein the further processing includes filtering.

15. The method of claim 14 wherein the further processing includes deblocking filtering.

* * * * *